April 14, 1970 R. GOTTSCHALD 3,506,290
BALL JOINT
Filed July 22, 1968
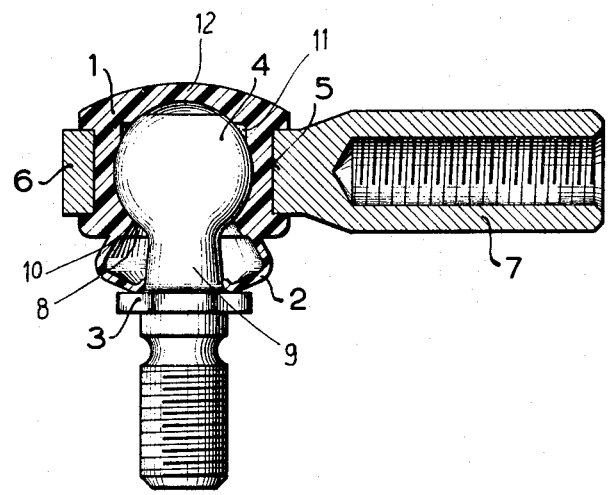

United States Patent Office 3,506,290
Patented Apr. 14, 1970

3,506,290
BALL JOINT
Rudolf Gottschald, deceased, late of Osterath, Germany, by Erika Gottschald, heir, Osterath, Germany, assignor to A. Ehrenreich & Cie, a firm of Germany
Filed July 22, 1968, Ser. No. 776,291
Claims priority, application Germany, July 21, 1967, E 25,478
(Filed under Rule 47(b) and 35 U.S.C. 118)
Int. Cl. F16c 11/06
U.S. Cl. 287—87                    4 Claims

ABSTRACT OF THE DISCLOSURE

A ball joint of injection moulded polyurethane having a joint case interior which is cylindrical and smaller than the ball head. The case has an integrally formed bellow packing secured to a funnel-shaped opening.

---

The present invention relates to a ball joint in the form of an angular joint, especially for gear connections, for instance, with windshield wipers, gear control mechanisms, etc., comprising a joint case providing for a gear connection piece and a ball head being located at a joint pin and universally movable in said joint case.

It is the main object of the present invention to provide a simple, safe and essentially service free ball joint of the above type for gear connections.

According to the present invention this problem has been solved by providing a joint case together with a bellow packing for the opening where the joint pin leaves the joint case, having been produced in a single injection moulding process from polyurethane with an interlaced structure, and an injection moulded reinforcement in the form of a ring located in a peripheral recess of the joint case, and a connection piece for a gear part which forms a single piece with the ring.

According to this a ball joint of the type mentioned above has been provided only consisting of three parts, of which the joint case to be produced in an injection moulding process together with the bellow packing as well as the reinforcement ring also to be injection moulded do not require any further finishing following their production, while it is only the joint pin of the ball head which needs finishing. Manufacture of the joint case from polyurethane is furthermore favorable in that the joint case has not only a certain elasticity enabling the ball head to be pressed into the joint case, but also gliding properties due to which, as a rule, additional lubrication will not be necessary. Moreover it will be possible to press the joint case together with the ball head located in the same into the reinforcement ring which, for this end, does not require any finished surfaces and may be a cheap injection moulded metal part. The reinforcement ring fits snugly fitting into the recess of the joint case and offers sufficient stability to the joint case, despite its elasticity, to be able to receive transverse loads and loads occurring in the direction of an angular deflection. In this case the height of the reinforcement ring is favorably such that on either side of the ball equator only a comparatively short hollow projection will be left by the ring. At the same time the joint will be protected against insertion of dirt, dust, moisture or the like in the passage side of the joint pin without requiring any additional measures.

Preferably, the bellow packing starts at a certain distance from the exterior rim of the funnel shaped opening of the joint case for the passage of the joint pin, thus preventing damage to the bellow packing at its starting point in the presence of major angular deflections of the joint pin.

Preferably, the joint case will be closed at the side not facing the passage opening of the joint pin, thus preventing dirt, dust, moisture or the like from entering the joint case on this side.

It is recommended in this respect to vault the exterior surface of the joint case towards the outside thus improving the pressure holding the joint case in the reinforcement ring.

It will also be favorable if the joint case chamber receiving the ball head, on the side facing the closed joint case side between the interior surface of the joint case contacting said side and the interior surface of the joint case contacting the ball head within the peripheral ring, is in the shape of a cylinder having a diameter less than that of the ball head. Said cylindrical interior surface of the joint case not contacting the ball head facilitates insertion of the ball head into the joint case in that the inside of the polyurethane material has a certain flowability which however in the assembled joint, that is, in the joint case provided with the reinforcement, does not have any negative influence.

The axis of the peripheral ring is positioned transversally with respect to the axis of the connection piece.

The drawing shows an embodiment according to the present invention by illustrating a vertical section of an angular joint.

The joint case has been identified by 1. On the side of its passage opening 8 for the joint pin 9 it has been provided with a bellow packing 2 which forms a single unit with the joint case. The joint case 1 and the bellow packing 2 are made from polyurethane with an interlaced structure in an injection moulding process. The passage opening 8 for the joint pin 9 is widened towards the outside in the shape of a funnel. The bellow packing starts at a certain distance from the exterior rim 10 of the funnel-shaped passage opening. The end of the bellow packing 2 not facing the joint case is tightly surrounding the shaft of the joint pin and contacting the collar 3 of the joint pin.

On the side not facing the passage opening of the joint pin the joint case has been closed and vaulted towards the outside. The vaulted surface has been defined as 12. Due to the limited elasticity of the joint case consisting of polyurethane with an interlaced structure it will be possible to press the ball head 4 into the joint case like a press button.

The joint case has been provided with a peripheral groove 5. An injection moulded reinforcement 6 in the form of a ring snugly fits into said peripheral groove. Together with the peripheral ring 6 the connecting piece or connector 7 of a closed cross section for a gear part forms a single unit. The joint case containing the ball head is pressed into the peripheral ring.

On the side of the joint case chamber receiving the ball head 4 which is facing the closed side of the joint case, and between the interior surface of the joint case contacting the ball head 4 on this side and the interior surface of the joint case contacting the ball head within the peripheral ring, the joint case chamber has the form of a cylinder 11 having a diameter less than that of the ball head.

What is claimed is:

1. A ball joint in the form of an angular joint comprising:
   (a) a joint case,
   (b) a ball head universally movable in said case,
   (c) a joint pin connected to said head,
   (d) said case having a bellow packing integrally formed in an injection moulding process from polyurethane with an interlaced structure,
   (e) a peripheral recess in said case, (f) an injection moulded reinforcement ring in said recess and having a connection piece integrally formed therewith, (g) said case having an opening and said bellow packing being connected to the outer edge of said opening, (h) said case having a closed vaulted-out portion opposite said opening, (i) said case having an interior surface receiving said ball head, said surface between said closed portion and the point of contact of said ball head within the zone of said peripheral ring being cylindrical in shape with a daimeter less than that of said ball head.

2. A ball joint as defined in claim 1 wherein the axis of said reinforcement ring is transverse to the axis of said connection piece.

3. A ball joint as defined in claim 1 wherein said opening is funnel-shaped.

4. A ball joint as defined in claim 1 wherein said connection piece is in the form of an elongated internally threaded means.

References Cited

UNITED STATES PATENTS

| 2,424,914 | 7/1947 | Brown. | |
| 2,754,141 | 7/1956 | Latzen. | |
| 3,068,031 | 12/1962 | Herbenar et al. | |
| 3,389,925 | 6/1968 | Gottschald | 287—87 |
| 3,389,926 | 6/1968 | Gottschald | 287—87 |

FOREIGN PATENTS

| 620,686 | 3/1961 | Italy. |
| 1,366,571 | 6/1964 | France. |

DAVID J. WILLIAMOWSKY, Primary Examiner

A. KUNDRAT, Assistant Examiner